United States Patent [19]

Perlov

[11] Patent Number: 4,788,612
[45] Date of Patent: Nov. 29, 1988

[54] EXTENDED METAL IN GAP HEAD

[75] Inventor: Craig M. Perlov, Bloomington, Minn.

[73] Assignee: Magnetic Peripherals Inc., Minneapolis, Minn.

[21] Appl. No.: 76,441

[22] Filed: Jul. 22, 1987

[51] Int. Cl.[4] .......................... G11B 5/187; G11B 5/193
[52] U.S. Cl. .................................. 360/120; 360/122; 360/126
[58] Field of Search .............. 360/126, 127, 121, 122, 360/103, 120

[56] References Cited

U.S. PATENT DOCUMENTS

| 3,000,078 | 9/1961 | Emenarker et al. | 29/155.5 |
| 3,146,317 | 8/1964 | Kuhrt et al. | 179/100.2 |
| 3,487,391 | 12/1969 | Todt | 340/174.1 |
| 3,566,045 | 2/1971 | Paine | 179/100.2 |
| 3,893,187 | 7/1975 | Kanai et al. | 360/115 |
| 4,559,572 | 12/1985 | Kumasaka et al. | 360/110 |
| 4,646,184 | 2/1987 | Goto et al. | 360/120 |

FOREIGN PATENT DOCUMENTS 58-17522  2/1983  Japan .................................. 360/120

Primary Examiner—Robert S. Tupper
Attorney, Agent, or Firm—R. M. Angus; J. A. Genovese; R. E. Billion

[57] ABSTRACT

A read write head for magnetic recording on a magnetic media includes a core having a gap with confronting surfaces. To increase the magnetic saturation properties of the head, one of the confronting surfaces is covered with a layer of material having a higher magnetic permeability than the material making up the core. An additional surface of the core is also covered with the higher magnetic permeability material to prevent the flux lines from fringing into the atmosphere at the joint. The two layers of material form an integral layer of the second higher permeability magnetic material.

4 Claims, 3 Drawing Sheets

EXTENDED METAL IN GAP HEAD

BACKGROUND OF THE INVENTION

Optimizing a particular recording system having a magnetic media and a ferrite read and write head entails balancing a number of factors. In order to increase the voltage of a pulse on read back, it is desirable to produce a magnetic media with a large coercive force. It is also desirable to have the magnetic field strength changing at a rapid rate when the magnetic field strength equals the coercive force during the write mode. This produces sharp pulses.

Several factors control the magnetic field. The strength of the magnetic field can be increased by increasing the current level in the core. The core material, however will saturate when the current level reaches a certain level. The level varies depending on the material comprising the core.

In the past, ferrite was used as the core material. The problem with ferrite alone is that the usable coercive force of the medium is limited by the magnetic saturation of the core material. If the current in the windings is increased beyond the ferrite saturation level, the magnetic field strength does not change at a rapid rate when the magnetic field strength equals the coercivity.

To increase the rate of change of the magnetic field, a layer of higher permeability material was placed on the confronting surface of the C-core. This layer prevented the magnetic field from leaving the core at most areas other than at the gap. The current level in the coil could be changed to vary the field strength to a level where the magnetic field strength would change at a rapid rate when the field strength equaled the medium coercivity value.

This represented an advance, however this advance produced additional problems. The junction between the ferrite and the higher permeability metal on the confronting surface creates a ghost gap or another small gap. At the ghost gap flux lines leave the ferrite, enter the atmosphere, and reenter the high permeability layer on the other side of the ghost gap. The flux lines in the atmosphere near the ghost gap cause noise in the magnetic system by magnetizing the magnetic media below the ghost gap. On read back undesirable ghost images or pulses are produced which makes decoding the read data pulses more difficult since the actual data pulses must be differentiated from the ghost images.

Thus, there is a need for a head which can be driven at higher current levels without saturating and which eliminates ghost images when the data is read back from the magnetic media. The absence of ghost images on read back would ease decoding of the signals and the current level could be increased so that the rate of change in the field strength would be rapid when the field strength equaled the coercivity value.

SUMMARY OF THE INVENTION

An apparatus which allows a magnetic head to be driven at higher current rates without magnetically saturating and without producing ghost images is disclosed. A layer of material, which has higher magnetic permeability than the remaining material comprising the core, is applied to the confronting surface of the "C". This forms a joint or interface between the two materials substantially parallel to the gap. A layer of the same higher magnetic permeability material is also deposited on a surface of the "C" core and covers the joint between the two materials. Noise is eliminated since the flux lines that previously would enter the atmosphere near the joint, also known as ghost gap, will now remain contained in the core within the layer of high permeability material on the surface covering the joint. This magnetic head can also be driven at various current levels so as to vary the magnetic field until the magnetic field strength is changing at a maximum rate when it equals the coercivity of the magnetic medium.

BRIEF DESCRIPTION OF THE DRAWINGS

For a better understanding of the present invention, reference may be had to the accompanying drawings, in which:

FIG. 3 shows the flux lines at the joint.

These drawings are not intended as a definition of the invention but are provided solely for the purpose of illustrating the preferred embodiments of the invention described below.

THE PRIOR ART

Figure 1:
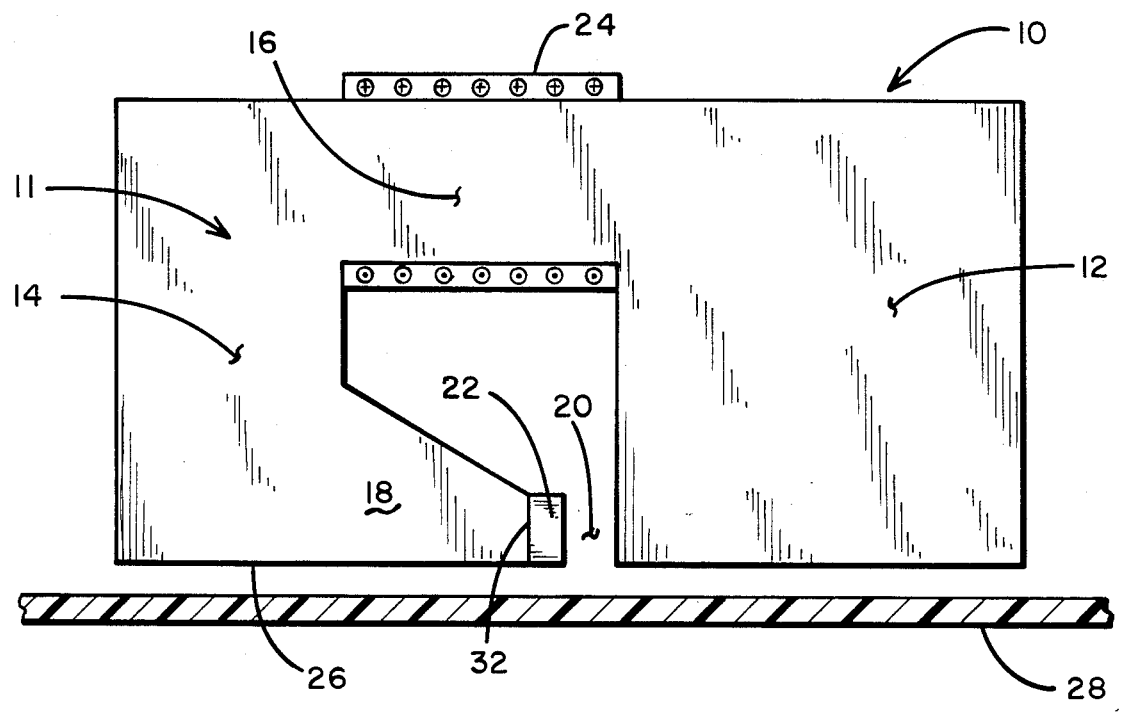
FIG. 1 is a side view of a prior art head with metal on one of confronting surfaces in the the gap.

FIG. 1 shows a magnetic head 10 having a unitary core 11. The core 11 is comprised of a first pole element, commonly called an "I" bar 12, which is rectangularly shaped and a second pole element commonly called a "C" bar 14, which is C-shaped. The "C" bar 14 has a leg 16 and a leg 18. The leg 16 is longer than the leg 18. The "I" bar 12 and the leg 16 of the "C" bar are joined to form the unitary core 11. The "C" bar 14 and "I" bar 12 are joined so that the shorter leg 18 terminates near the "I" bar 12 and their confronting surfaces form a gap 20 between the "I" bar 12 and the "C" bar 14. The "I" bar 12 and the "C" bar 14 are made of a first ferromagnetic material, such as ferrite.

A thin film 22 of a second magnetic material is deposited on the confronting surface of the "C" bar 14 adjacent the gap 20. The second magnetic material has a higher magnetic permeability than the first ferromagnetic material which makes up the "I" bar 12 and the "C" bar 14. A coil 24 is wrapped around the leg 16 of the "C" bar 14. As is well known in the art, passing current through the coil 24 produces a magnetic field in the magnetic head 10. The magnetic field jumps the gap 20. The magnetic head 10 has an air-bearing surface 26 which is substantially perpendicular to the gap 20. The gap 20 is along the air bearing surface 26. When the air-bearing surface 26 is passed over a magnetic media 28, the magnetic field fringing from the gap 20 enters the magnetic media 28 and magnetizes it.

Figure 2:
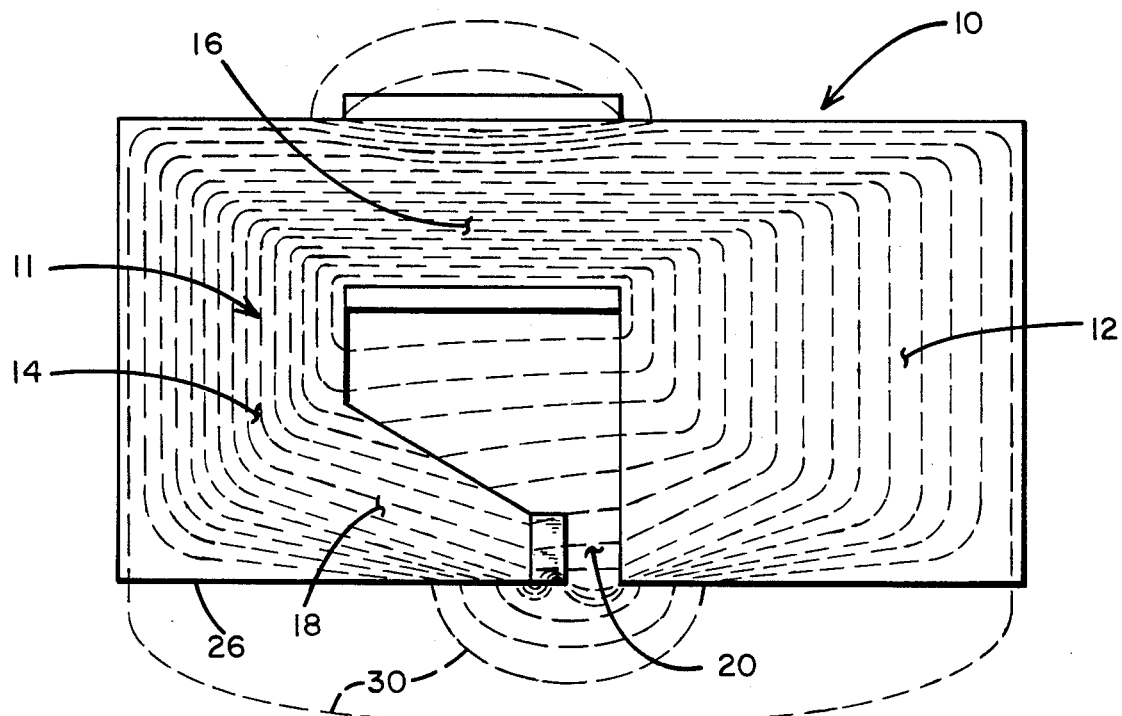
FIG. 2 is a side view of the prior art head shown in FIG. 1 showing lines of flux.

Now turning to FIG. 2, the magnetic head 10 is shown with magnetic field lines 30. For the sake of clarity, the coil 24 has been eliminated from FIG. 2. The broken lines 30 denote the pattern of the magnetic field in and around the magnetic head 10. As the current in the coil 24 is increased, the density of the lines, also known as magnetic flux, also increases.

Figure 3:
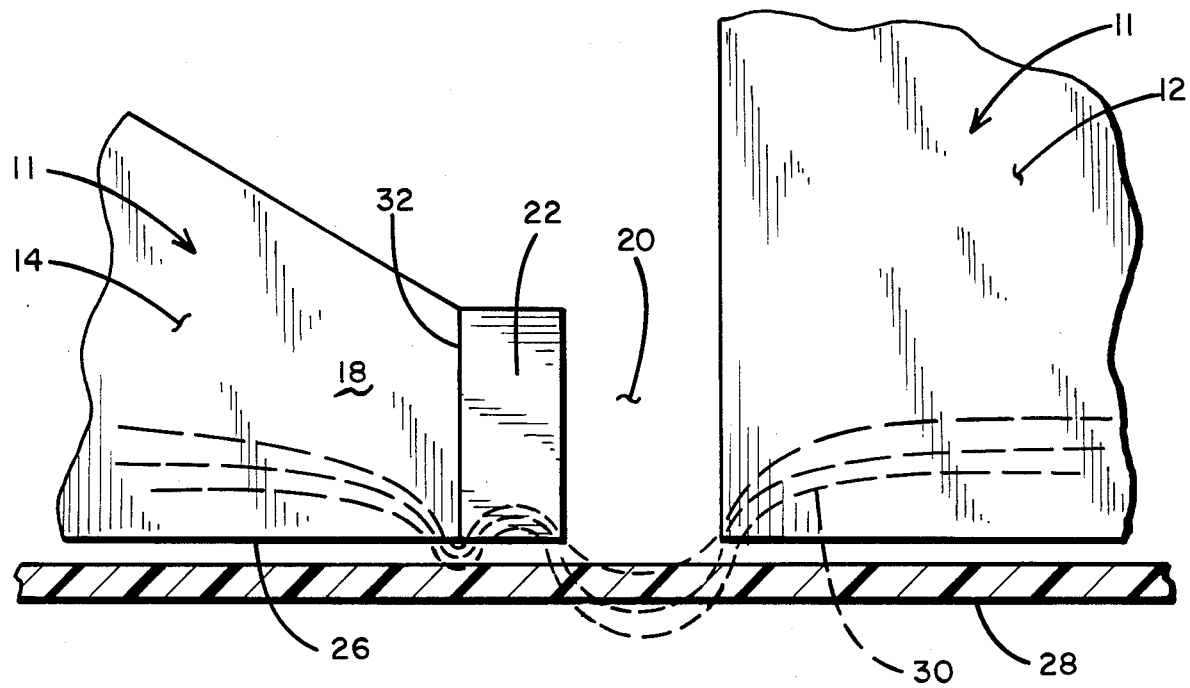
FIG. 3 is an exploded view of the joint between the metal on one of the confronting surfaces of the gap and the remaining portion of the head shown in FIG. 1.

A joint 32 or interface between the short leg 18 and the thin metal film 22 acts as a gap. FIG. 3 clearly shows that the magnetic field lines 30 leave the short leg 18 of the "C" bar 14, enter the atmosphere and the reenter the thin film 22. The joint 32 causes problems in the form of noise when the data is read back from the magnetic media 28. The field lines near the joint 32 also magnetize the magnetic media 28, although not to the same extent as when the field lines 30 leave the thin film 22, jump the gap 20, and then reenter the "I" bar 12. The noise caused by the field lines 30 near the joint 32 is in the form of ghost images of the magnetization produced in the medium 28 at the gap 20. The ghost images make differentiation of the read back signals more difficult.

Figure 4:
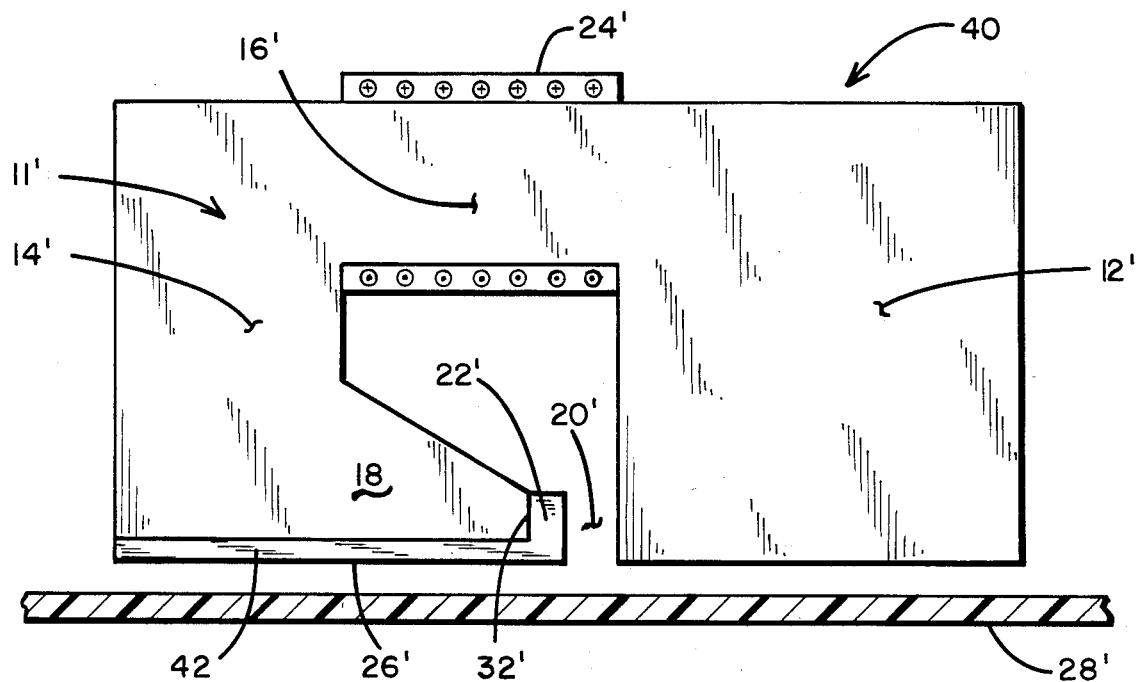
FIG. 4 is a side view of a first emboiment of the inventive head.
Figure 5:
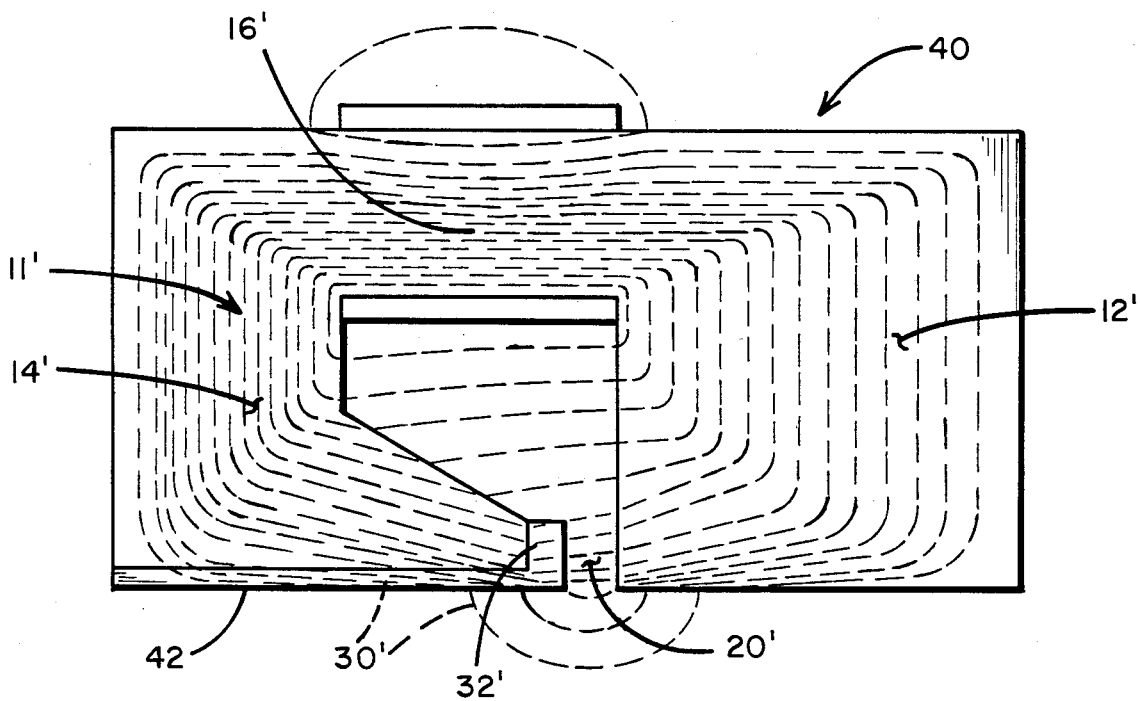
FIG. 5 is a side view of the head shown in FIG. 4 which shows the flux lines as they pass through the first embodiment of the inventive head.

FIGS. 4 and 5 show an inventive head 40 which contains the magnetic field lines 30' within the head 40 to prevent magnetization of the media near the joint 32' or pseudo gap.

The structure of the inventive magnetic head 40 is similar to the magnetic head 10. The inventive head 40 has the "I" bar 12' and the "C" bar 14'. The "C" bar 14' has two legs 16 and 18. The "I" bar 12 and "C" bar 14' are attached to form a unitary core 11' with the confronting surfaces forming a gap 20'. The inventive magnetic head 40 has the thin film 22' of the second magnetic material on one of the confronting surfaces adjacent the gap 20'.

In the inventive magnetic head 40, the second magnetic material used to form the thin film 22' adjacent the gap 20' is extended along the air bearing surface 26' of the "C" bar 14. This forms a layer 42 of the second magnetic material along the air bearing surface 26'. The second magnetic material has a higher level of magnetic saturation than the first ferromagnetic material, comprising the remaining portion of the "I" bar 12' and "C" bar 14'. The second magnetic material is a material such as an alloy of aluminum ferrite and silicon, known in the art as Alfesil.

The layer 42 overlaps the joint 32' on the air bearing surface 26'. The layer 42 prevents fringing of the magnetic field lines 30' near the joint 32'. The layer 42 has a higher magnetic saturation and carries the magnetic field lines 30' within the inventive head 40. As a result, no magnetic field lines 30' enter the magnetic media 28' near the joint 32' and no ghost images are produced on read back.

This beneficial result is easily explained with the help of FIG. 5. FIG. 5 shows the magnetic field lines 30' in the inventive magnetic head 40. The layer 42 has a higher magnetic permeability and therefore can carry a greater number of magnetic field lines 30' per unit of cross-sectional area. The layer 42 serves to contain the magnetic field lines 30'. The magnetic field lines will generally take the path of least reluctance. The atmosphere has a much lower permeability than the layer 42 of the second magnetic material. Since the layer 42 can carry more magnetic field lines than the first ferromagnetic material and since the layer 42 provides a lesser reluctance path to magnetic field flow, the magnetic field lines stay contained in the layer 42 rather than entering the atmosphere.

Figure 6:
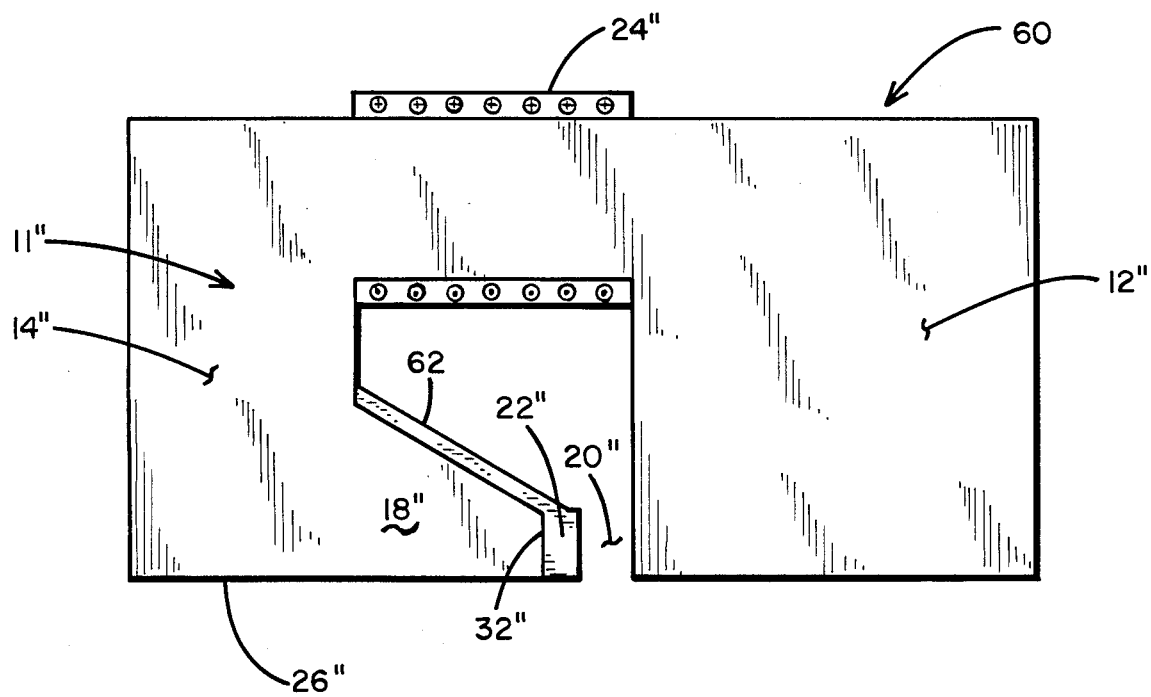
FIG. 6 is a side view of a second embodiment of the inventive head.

Shown in FIG. 6 is a second embodiment of another inventive head 60. The structure of the second embodiment of the inventive head 60 is similar to the structure of the magnetic head 10. The second inventive head 60 has the "I" bar 12" and the "C" bar 14". The "C" bar 14" has two legs 16" and 18". The "I" bar 12" and the "C" bar 14" are attached to form a unitary core 11" with confronting surfaces forming a gap 20". The second inventive head 60 has a thin film 22" of the second magnetic material on one of the confronting surfaces adjacent the gap 20". The second inventive head 60 also has a coil 24" around the portion of the "C" bar 14".

In the second inventive magnetic head 60, the second magnetic material used to form the thin layer 22" adjacent the gap 20" is extended to form an additional thin layer 62 on the inside surface of the "C" bar 14". The additional layer 62 also serves to contain magnetic field lines 30" (not shown in FIG. 6) within the core 11". Most of the head 60 is comprised of ferrite. When the current in the coil 24" is increased and the ferrite becomes magnetically saturated, the layer 62 of the second higher permeability material carries additional flux lines (not shown) that would enter the atmosphere along the air-bearing surface if the head 60 was made entirely of ferrite. The additional layer 62, therefore carries the flux lines that would cause ghost images at the joint 32" on the air-bearing surface 26".

The present intention and the best modes of practicing it have been described. It is to be understood that the foregoing descriptions are illustrative only and that other means and techniques can be employed without departing from the full scope of the invention as described in the appended claims.

What I claim is:

1. An apparatus for reading and writing data onto and from a magnetic medium comprising:
    a core constructed of a ferro-magnetic material having an air bearing surface which confronts the magnetic medium, said core having a transducing gap therein, said transducing gap forming a first confronting surface and a second confronting surface said first confronting surface having a smaller surface area than the second confronting surface;
    means for inducing a magnetic flux in the core;
    a first layer of magnetic material having a magnetic permeability greater than the ferro-magnetic material, said first layer deposited on said first confronting surface and forming a joint between said ferromagnetic material and said first layer, the joint being substantially parallel to said transducing gap; and
    a second layer of magnetic material having a magnetic permeability greater than the ferro-magnetic material deposited on the air bearing surface of the core adjacent said first confronting surface, the second layer being integral with said first layer of higher permeability magnetic material.

2. The apparatus of claim 1 wherein the second layer of higher permeability magnetic material overlaps the joint between the first layer of higher permeability magnetic material and the ferro-magnetic material of the core.

3. An apparatus for recording data comprising:
    a magnetic media; and
    a magnetic read and write head which comprises:
        a core of a first magnetic material which forms a flux path, said core having a transducing gap therein, the transducing gap forming two confronting surfaces, said core also having an air bearing surface opposite said magnetic media;
        a first layer of a second magnetic material deposited on one of the two confronting surfaces of the transducing gap, the first layer forming a joint between the first magnetic material and the second magnetic material;

a second layer of the second magnetic material deposited on a portion of said air bearing surface of the core, the second layer adjoining the first layer of the second magnetic material and covering said joint between the first layer and the core; and a coil of wire wrapped around a portion of the core which induces a magnetic flux in the core in response to a current passing through the coil, the first and second layers of the second magnetic material preventing magnetic flux from leaving the core along the air-bearing surface other than at the transducing gap, the magnetic media passed near the air bearing surface so that the magnetic flux near the transducing gap magnetizes the magnetic media.

4. An apparatus for reading and writing information from or onto a magnetic media comprising:

a flux path made of a ferro-magnetic material having an air bearing surface which passes over the magnetic media and said flux path having a transducing gap therein, the transducing gap forming two, substantially parallel confronting surfaces in the flux path;

a coil for inducing magnetic flux in the flux path; and a layer of material having a higher magnetic permeability than the ferro-magnetic material, said layer covering one confronting surface and extending along the air bearing surface of the flux path adjacent said one confronting surface to prevent lines of magnetic flux from fringing out into the atmosphere from a joint between the ferro-magnetic material and the higher permeability magnetic material on the covered confronting surface.

* * * * *